(12) United States Patent
Kondo (10) Patent No.: US 7,703,564 B2
(45) Date of Patent: Apr. 27, 2010

(54) FUEL CELL VEHICLE

(75) Inventor: Toshiyuki Kondo, Chiryu (JP)

(73) Assignee: Toyota Jidosha Kabuhsiki Kaisha, Toyota-shi (JP)

( * ) Notice: Subject to any disclaimer, the term of this patent is extended or adjusted under 35 U.S.C. 154(b) by 0 days.

(21) Appl. No.: 11/588,377

(22) Filed: Oct. 27, 2006

(65) Prior Publication Data

US 2007/0039767 A1 Feb. 22, 2007

Related U.S. Application Data (60) Division of application No. 11/008,601, filed on Dec. 10, 2004, now Pat. No. 7,270,202, which is a continuation of application No. PCT/JP03/03185, filed on Mar. 17, 2003.

(30) Foreign Application Priority Data

Jun. 10, 2002 (JP) ............... 2002-168381

(51) Int. Cl.
*B60K 1/00* (2006.01)
(52) U.S. Cl. .................. 180/65.31; 180/65.1; 180/65.8
(58) Field of Classification Search ................ 180/65.1, 180/65.3, 65.8, 65.31
See application file for complete search history.

(56) References Cited

U.S. PATENT DOCUMENTS

| | | | |
|---|---|---|---|
| 5,193,635 A | 3/1993 | Mizuno et al. | |
| 5,332,630 A | 7/1994 | Hsu | |
| 5,641,031 A * | 6/1997 | Riemer et al. | 180/65.3 |
| 5,704,644 A | 1/1998 | Jaggi | |
| 6,066,408 A | 5/2000 | Vitale et al. | |
| 6,255,008 B1 * | 7/2001 | Iwase | 429/9 |
| 6,372,373 B1 | 4/2002 | Gyoten et al. | |
| 6,378,637 B1 * | 4/2002 | Ono et al. | 180/65.3 |
| 6,598,691 B2 | 7/2003 | Mita et al. | |

(Continued)

FOREIGN PATENT DOCUMENTS

DE 21 24 786 A1 1/1970

(Continued)

OTHER PUBLICATIONS

European Search Report for Appln. No. 06118077.4—1523 issued Nov. 6, 2006.

(Continued)

*Primary Examiner*—Paul N Dickson
*Assistant Examiner*—John R Olszewski
(74) *Attorney, Agent, or Firm*—Kenyon & Kenyon LLP (57) ABSTRACT

In a fuel cell vehicle 10 of the invention, fuel cells 20 are integrally placed in a lower space 15 of a front seat 14, while a secondary battery 40 is integrally placed in a lower space 18 of a rear seat 17. The integral arrangements of the fuel cells 20 and the secondary battery 40 separately in the lower space 15 of the front seat 14 and in the lower space 18 of the rear seat 17 ensure high-performance operations of both the fuel cells 20 and the secondary battery 40 having different working environments. This arrangement also attains the effective use of the generally-dead, lower spaces 15 and 18 of the front and rear seats 14 and 17 to receive the fuel cells 20, the secondary battery 40, and their peripheral equipment.

24 Claims, 3 Drawing Sheets

U.S. PATENT DOCUMENTS

| | | | |
|---|---|---|---|
| 6,648,085 B2 * | 11/2003 | Nagura et al. | 180/65.1 |
| 6,874,588 B2 | 4/2005 | Kato et al. | |
| 6,907,947 B2 * | 6/2005 | Morita et al. | 180/65.1 |
| 6,923,282 B2 | 8/2005 | Chernoff et al. | |
| 2002/0060100 A1 | 5/2002 | Nagura et al. | |
| 2002/0081477 A1 | 6/2002 | McLean et al. | |
| 2002/0122970 A1 | 9/2002 | Inoue et al. | |
| 2002/0189873 A1 * | 12/2002 | Mizuno | 180/65.3 |
| 2003/0215687 A1 | 11/2003 | Bruck et al. | |
| 2004/0062955 A1 | 4/2004 | Kubota et al. | |
| 2004/0101725 A1 | 5/2004 | Kato et al. | |
| 2004/0108150 A1 | 6/2004 | Guidry et al. | |
| 2004/0108151 A1 | 6/2004 | Guidry et al. | |
| 2004/0262059 A1 | 12/2004 | Uozumi | |
| 2005/0130002 A1 | 6/2005 | Kurliwa et al. | |
| 2005/0139402 A1 | 6/2005 | Yamashita | |
| 2005/0224265 A1 | 10/2005 | Mizuno | |
| 2005/0227131 A1 | 10/2005 | Ueda et al. | |

FOREIGN PATENT DOCUMENTS

| | | |
|---|---|---|
| EP | 0 677 417 A1 | 10/1995 |
| EP | 1 182 721 A2 | 2/2002 |
| EP | 1 288 050 A1 | 3/2003 |
| FR | 2 684 347 A1 | 6/1993 |
| GB | 1179282 | 11/1972 |
| JP | 03-109126 | 5/1991 |
| JP | 03-155307 A | 7/1991 |
| JP | 07-156826 A | 6/1995 |
| JP | 09-272344 | 10/1997 |
| JP | 11-113105 A | 4/1999 |
| JP | 2000-233648 A | 8/2000 |
| JP | 2000-238541 A | 9/2000 |
| JP | 2001-071753 | 3/2001 |
| JP | 2001-113960 | 4/2001 |
| JP | 2001-233064 A | 8/2001 |
| JP | 2003-72392 A * | 8/2001 |
| JP | 2001-253248 | 9/2001 |
| JP | 2001-266921 A | 9/2001 |
| JP | 2001-307758 A | 11/2001 |
| JP | 2002-017921 | 1/2002 |
| JP | 2002-089793 | 3/2002 |
| JP | 2002-141079 A | 5/2002 |
| JP | 2002-151123 A | 5/2002 |
| JP | 2003-123822 | 4/2003 |

OTHER PUBLICATIONS

Korean Office Action No. JP-2004-7019950, issued Jan. 24, 2006 (Related to reference JP 09-272344).

English language partial translation of Korean Office Action No. JP-2004-7019950, issued Jan. 24, 2006 (Related to reference JP 09-272344).

Chinese Language Version of Chinese Office Action, Appln. No. 03812854.3, issued Mar. 31, 2006 (Related to references JP 2001-071753 and JP 2002-089793).

English language translation of Chinese Office Action, Appln. No. 03812854.3, issued Mar. 31, 2006 (Related to references JP 2001-071753 and JP 2002-089793).

Supplemental Search Report dated Jul. 29, 2005 (Related to references EP 1 288 050 A1, EP 0 677 417 A1, DE 21 24 786 A1, and GB 1,179,282).

* cited by examiner

FUEL CELL VEHICLE

This is a divisional of U.S. application Ser. No. 11/008,601 filed Dec. 10, 2004, now U.S. Pat. No. 7,270,202 which claims priority to Japanese patent application No. 2002-168381 filed Jun. 10, 2002, and which is a continuation of PCT/JP03/03185 filed Mar. 17, 2003. The contents of each of the foregoing applications are incorporated herein by reference in their entirety.

BACKGROUND OF THE INVENTION

1. Field of the Invention

The present invention relates to a fuel cell vehicle that is equipped with a drive motor, fuel cells, and an accumulator.

2. Prior Art to be Disclosed

As is known in the art, a fuel cell vehicle is typically equipped with a drive motor, fuel cells, and a secondary battery and has a front seat and a rear seat where a driver and passengers are seated. For example, one proposed fuel cell vehicle disclosed in Japanese Patent Laid-Open Gazette No. 2001-113960 has a secondary battery and fuel cells that are placed below the vehicle floor to be aligned in a longitudinal axis of the vehicle.

The secondary battery and the fuel cells having different working environments are arranged close to each other. This layout is undesirable for the high-performance operations of the secondary battery and the fuel cells. There is generally not a sufficient space to receive both the secondary battery and the fuel cells. This layout is not suitable for vehicles having relatively low ground levels, for example, four-door sedans and two-door sedans.

In order to remove these drawbacks described above, the present invention aims to provide a fuel cell vehicle that ensures high-performance operations of both the fuel cells and the accumulator having different working environments. The present invention also aims to arrange fuel cells and accumulator, attaining the effective use of the generally-dead spaces in fuel cell vehicle. The present invention also aims to provide a fuel cell vehicle that assures the required minimum ground level of the vehicle.

SUMMARY OF THE INVENTION

In order to achieve at least part of the above aims, the present invention is directed to a fuel cell vehicle that is equipped with a drive motor, fuel cells, and an accumulator and has a front seat and a rear seat, on which a driver and a passenger are seated, wherein the fuel cells are integrally placed in a lower space of one of the front seat and the rear seat, and the accumulator is integrally placed in a lower space of the other of the front seat and the rear seat.

In the fuel cell vehicle of the invention, the fuel cells are not arranged in parts in the lower spaces of the front and rear seats, and the accumulator is not arranged in part in the lower spaces of the front and rear seats. The fuel cells are integrally arranged in the lower space of the front seat, whereas the accumulator is integrally arranged in the lower space of the rear seat. Alternatively the fuel cells are integrally arranged in the lower space of the rear seat, whereas the accumulator is integrally arranged in the lower space of the front seat. The integral arrangements of the fuel cells and the accumulator separately in the lower space of the front seat and in the lower space of the rear seat ensure high-performance operations of both the fuel cells and the accumulator having different working environments. This arrangement also attains the effective use of the generally-dead, lower spaces of the front and rear seats.

Here the terminology 'front seat' and 'rear seat' respectively denote a seat on the front side of the vehicle and a seat on the rear side of the vehicle. For example, in a vehicle with three rows of seats aligned in the longitudinal axis of the vehicle, when a seat in the front row is defined as the front seat, a seat in either the middle row or the rear row is set to the rear seat. When the seat in the middle row is defined as the front seat, on the other hand, the seat in the rear row is set to the rear seat. The 'drive motor' may use both or either one of the fuel cells and the accumulator as the power source. The 'accumulator' may be any chargeable and dischargeable storage battery, for example, a secondary battery or a capacitor.

In the fuel cell vehicle of the invention, peripheral equipment of the fuel cells and the accumulator may be arranged in any of the lower space of the front seat, the lower space of the rear seat, a front vehicle chamber in the vicinity of front wheels, and a rear vehicle chamber in the vicinity of rear wheels. The peripheral equipment may be located collectively or placed separately. The generally-dead, lower spaces of the front and rear sheets and the relatively-roomy front and rear vehicle chambers are thus effectively used to receive the peripheral equipment of the fuel cells and the accumulator.

Here the 'peripheral equipment of the fuel cells and the accumulator' include, for example, a drive motor driven with at least one of the fuel cells and the accumulator as the power source, a control unit used to regulate the driving force of the drive motor, and diversity of auxiliary machinery (including a fuel gas supply unit, an oxidizing gas supply unit, and a cooling unit) used to operate the fuel cells.

In the fuel cell vehicle of the invention, the lower space of the front seat or the lower space of the rear seat may be formed not to interfere with a foot space of any of the driver and the passenger. This arrangement does not reduce comfortableness in the foot space.

In the fuel cell vehicle of the invention, the lower space of the front seat is formed below the front seat and is defined by a virtual vertical plane including a knee joint position of the driver or the passenger seated on the front seat and by a virtual vertical plane including a lower end of a seat back of the front seat. The lower space of the rear seat is formed below the rear seat and is located behind a virtual vertical plane including a knee joint position of the passenger seated on the rear seat. The fuel cells or the accumulator located in the lower space of the front seat does not sacrifice the riding comfortableness of the driver and the passenger seated on the front seat. Similarly neither the fuel cells nor the accumulator located in the lower spaces of the front seat and the rear seat sacrifices the riding comfortableness of the passengers seated on the rear seat. In the case where the seat in the rear row is set to the rear seat, it is not required to specify a rear boundary of a lower space of the rear seat. In the case where the rear seat is other than the seat in the rear row (for example, the seat in the middle row), however, it is desirable to specify the rear boundary of the lower space of the rear seat by a virtual vertical plane including a lower end of the seat back of the rear seat for the better riding comfortableness of the passengers seated on the seat in the rear row.

In the fuel cell vehicle of the invention, at least part of auxiliary machinery of the fuel cells maybe arranged together with the fuel cells in the lower space of either of the front seat and the rear seat. The fuel cells and part or all of the auxiliary machinery of the fuel cells are placed together in the lower space of either the front seat or the rear seat. This arrangement desirably simplifies the gas piping layout, compared with separate arrangement of the auxiliary machinery from the fuel cells. It is preferable that the at least part of the auxiliary machinery of the fuel cells is aligned with the fuel cells in a direction of width of the vehicle in the lower space of either of the front seat and the rear seat. The lower space of each seat generally has a greater dimension along the width of the vehicle than a dimension in the longitudinal axis of the vehicle. Such dimensions enable the aligned arrangement of the fuel cells and part or all of the auxiliary machinery along the width of the vehicle. In the fuel cell vehicle of the invention, at least part of auxiliary machinery of the fuel cells maybe arranged in a center tunnel. In a vehicle with a center tunnel, the space of the existing center tunnel is effectively used to receive the auxiliary machinery. This advantageously does not sacrifice any riding space of the driver and the passengers.

Here the 'auxiliary machinery of the fuel cells' represent diversity of equipment required for operations of the fuel cells and include, for example, an oxidizing gas supply unit to feed a supply of oxidizing gas to the fuel cells, a fuel gas supply unit to feed a supply of fuel gas to the fuel cells, a humidifier to humidify the fuel gas fed to the fuel cells, a mass flow controller to regulate the pressure and the flow rate of the fuel gas fed to the fuel cells, a fuel gas circulation pump to recirculate non-reacted fuel gas exhaust, which is discharged from the fuel cells, to the fuel cells, and a water pump to circulate a flow of cooling water through the fuel cells for cooling the fuel cells down.

In one preferable structure of the fuel cell vehicle of the invention, center pillars are formed upright between the lower space of the front seat and the lower space of the rear seat. In the event of a side collision, the center pillars receive a large part of the impact. The presence of the center pillars thus desirably protects the fuel cells and the accumulator from the crash impact.

The present invention is also directed to a fuel cell vehicle equipped with a drive motor, fuel cells, and an accumulator, wherein the drive motor, the fuel cells, and the accumulator are arranged in this order along a longitudinal axis of the vehicle from front to rear of the vehicle. This arrangement desirably shortens the length of a relatively large-diameter wire connecting the drive motor to the fuel cells and thus attains the compact layout, compared with the arrangement of the drive motor, the accumulator, and the fuel cells in this order.

The present invention is further directed to a fuel cell vehicle equipped with a drive motor, fuel cells, and an accumulator, wherein a cooling system of the fuel cells, the fuel cells, and the accumulator are arranged in this order along a longitudinal axis of the vehicle from front to rear of the vehicle. This arrangement desirably shortens the distance between the fuel cells and the cooling system and thus attains the compact layout, compared with the arrangement of the cooling system of the fuel cells, the accumulator, and the fuel cells in this order.

In one preferable embodiment of the fuel cell vehicle of the invention, the drive motor is placed in a front vehicle chamber in the vicinity of front wheels, and a fuel gas source for feeding a supply of fuel gas to the fuel cells is placed in a rear vehicle chamber in the vicinity of rear wheels. This arrangement attains the optimum weight balance along the longitudinal axis of the vehicle. In this case, said fuel cell vehicle may further include a control module that controls supplies of electric power from the fuel cells and the accumulator and thereby regulates an output of the drive motor, and the control module may be arranged together with the drive motor in the front vehicle chamber in the vicinity of the front wheels. This arrangement more adequately attains the optimum weight balance along the longitudinal axis of the vehicle. The fuel gas source may be a hydrogen tank (for example, a hydrogen gas container or a hydrogen storage alloy) or a reformer that produces hydrogen-rich gas through reaction of a hydrocarbon fuel with water.

In the fuel cell vehicle of the invention, it is preferable that at least part of the fuel cells is located above a floor level of the vehicle. This layout readily assures the required minimum ground level of the vehicle, compared with the layout of the fuel cells wholly located below the floor level of the vehicle. Here the terminology 'floor level of the vehicle' means a horizontal plane including a point that is in contact with the heel of the driver who is seated on the driver's seat and drives the vehicle.

In the fuel cell vehicle of the invention, it is also preferable that at least part of the accumulator is located above a floor level of the vehicle. This layout readily assures the required minimum ground level of the vehicle, compared with the layout of the accumulator wholly located below the floor level of the vehicle.

In the fuel cell vehicle of the invention, the fuel cells may be placed outside a passenger compartment of the vehicle (in the front vehicle chamber, in the rear vehicle chamber, or below the vehicle floor) or inside the passenger compartment (above the vehicle floor). The accumulator may similarly be placed outside or inside the passenger compartment.

DESCRIPTION OF THE PREFERERRED EMBODIMENT

Figure 1:
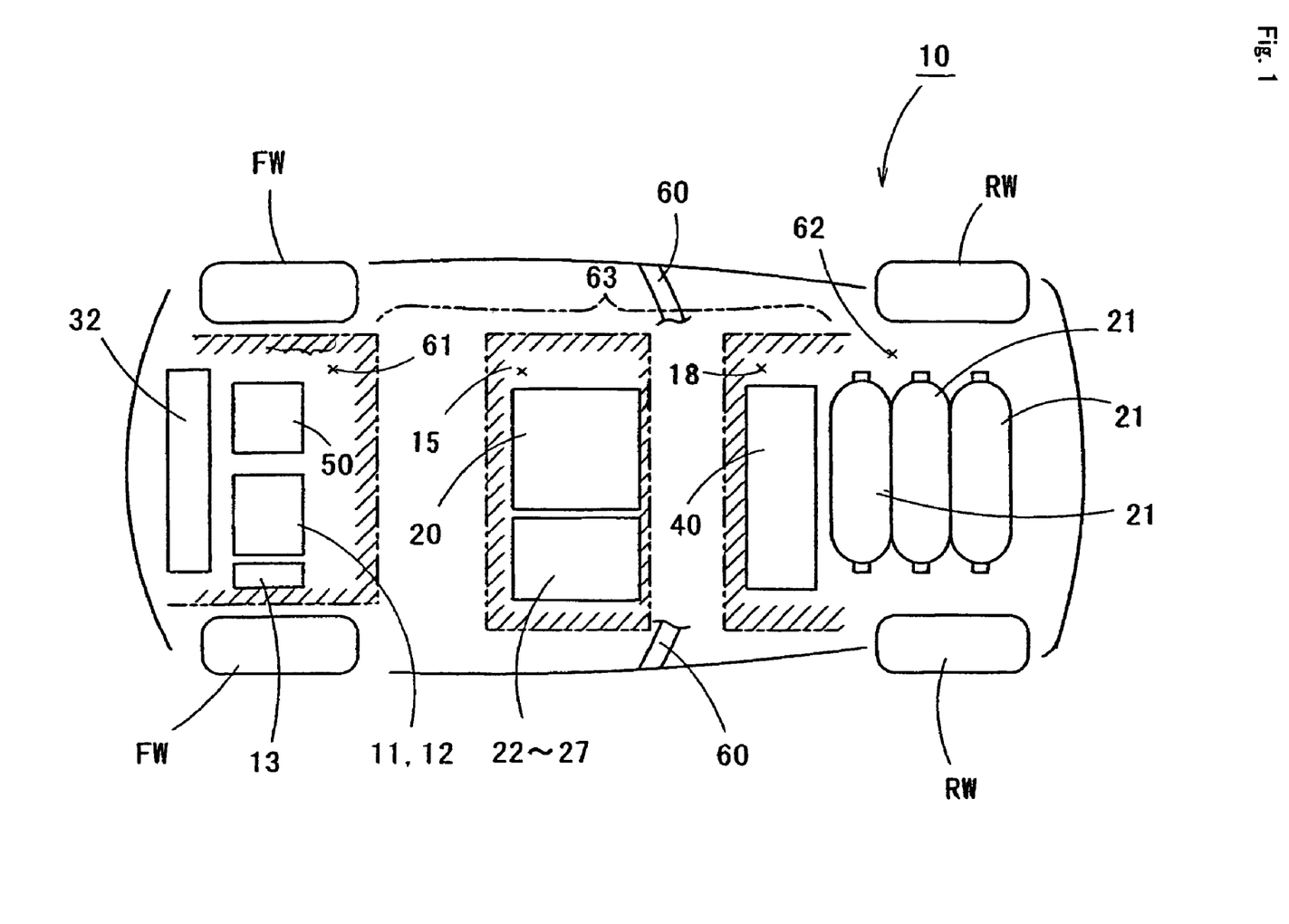
FIG. 1 is a plan view schematically illustrating the configuration of a fuel cell vehicle in one embodiment of the invention.
Figure 2:
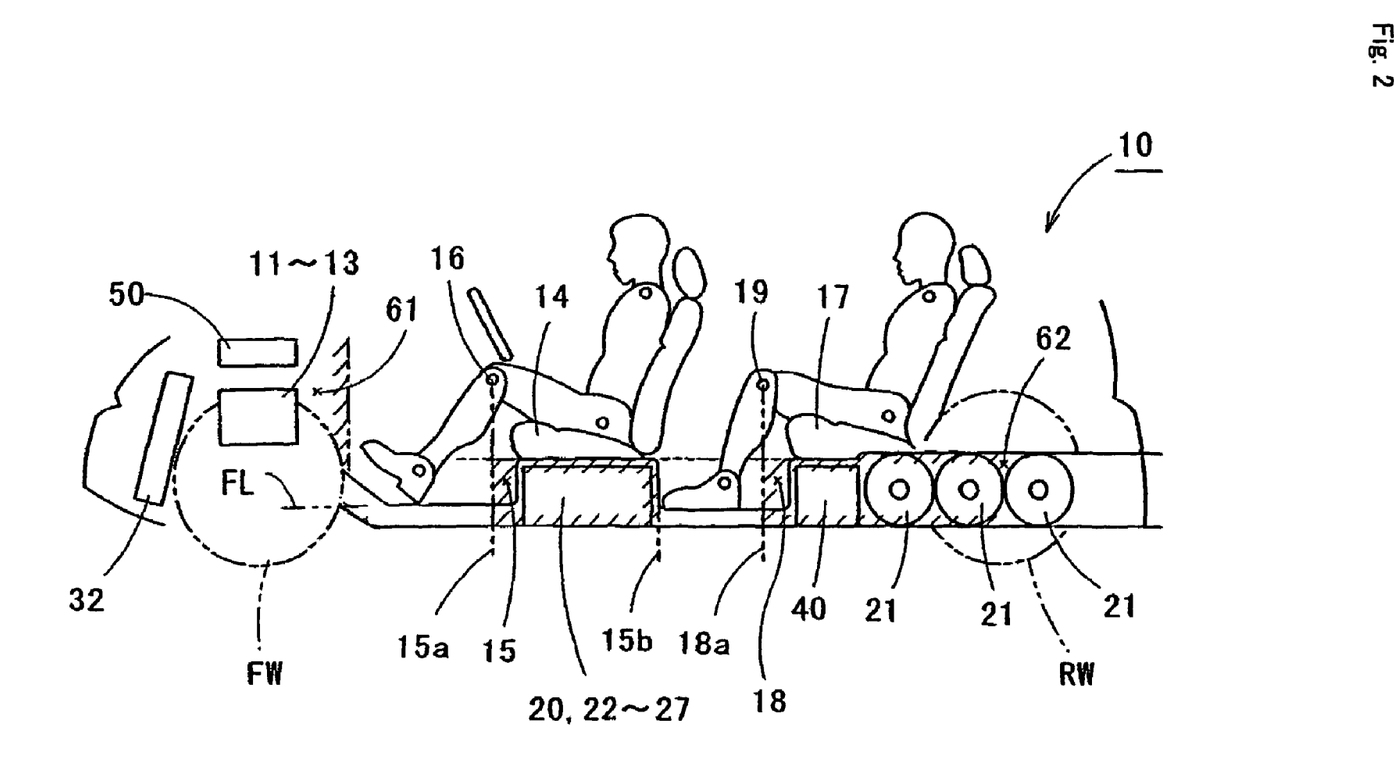
FIG. 2 is a side view schematically illustrating the fuel cell vehicle.
Figure 3:
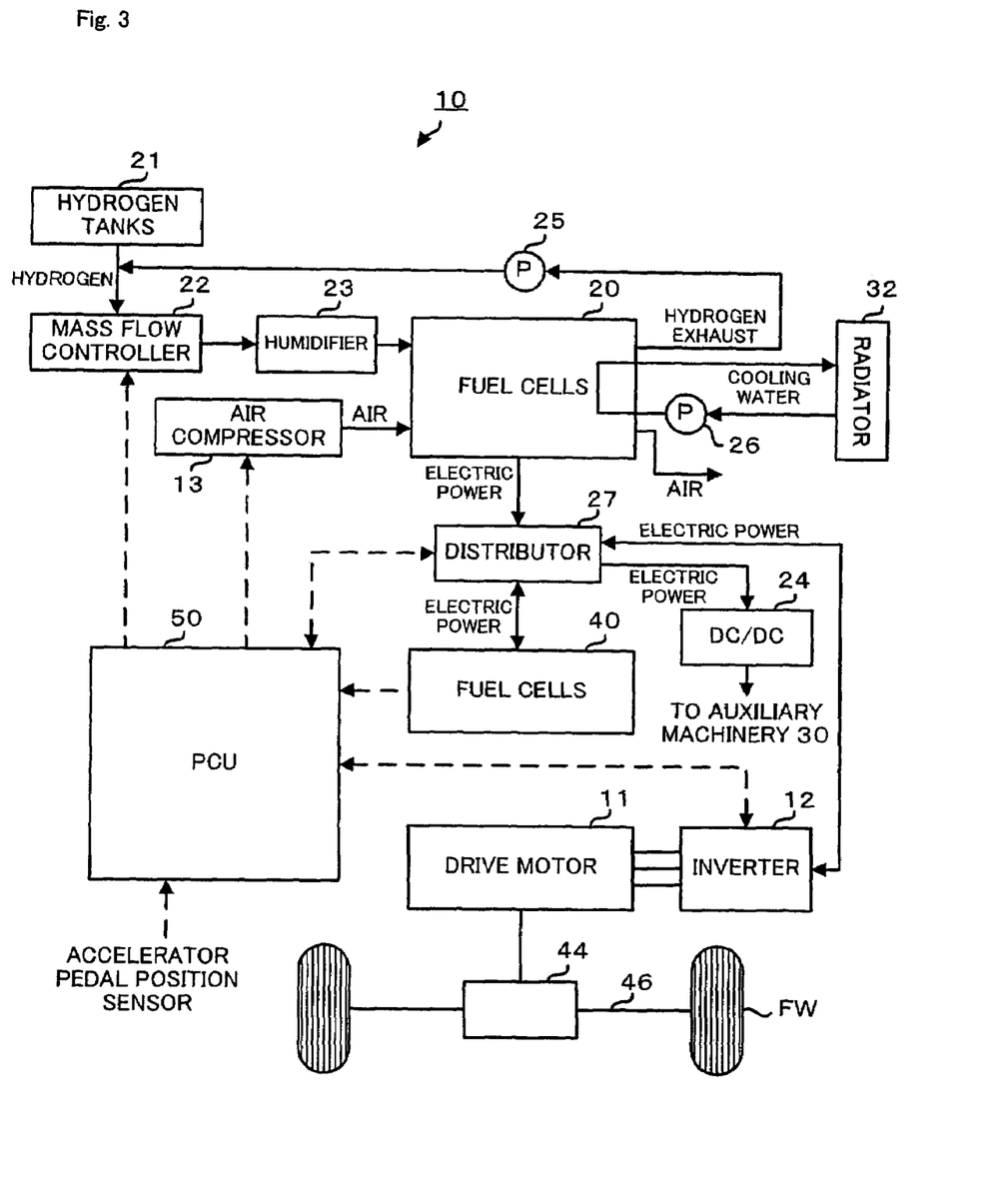
FIG. 3 is a block diagram showing the internal structure of the fuel cell vehicle.

In order to clarify the objects, features, aspects, and advantages of the present invention, one mode of carrying out the invention is described below with reference to the accompanied drawings. FIGS. 1 and 2 are respectively a plan view and a side view schematically illustrating the configuration of a fuel cell vehicle 10 in one embodiment of the invention. FIG. 3 is a block diagram showing the internal structure of the fuel cell vehicle.

The fuel cell vehicle 10 of this embodiment has a monocoque chassis construction of integrated chassis frame and body and mainly includes a drive motor 11, a front seat 14, a rear seat 17, fuel cells 20, a secondary battery 40, and a power control unit (PCU) 50. The monocoque chassis construction may be replaced by a frame construction.

The drive motor 11 is a three-phase synchronous motor and is located with an inverter 12 in the periphery of front wheels FW, more specifically in a front vehicle chamber 61, which is parted from a passenger compartment 63 by a dash panel. A DC power output from the fuel cells 20 or the secondary battery 40 goes through a distributor 27 and is converted into three-phase alternating current by the inverter 12, as shown in FIG. 3. The drive motor 11 receives a supply of electric power in the form of three-phase alternating current. In response to the supply of electric power, the drive motor 11 generates a rotational driving force, which is transmitted to an axle 46 of the front wheels FW via a differential gear 44 as the power of driving the fuel cell vehicle 10.

The front seat 14 is a seat in a front row out of two rows of seats provided in the passenger compartment 63 and includes a driver's seat and a front passenger's seat. The rear seat 17 is a bench seat in a rear row out of the two rows of seats. Center pillars 60, 60 are formed upright on a left side face and a right side face to be located between the front seat 14 and the rear seat 17 in the fuel cell vehicle 10.

The fuel cells 20 are known polymer electrolyte fuel cells and form a stack structure including a large number of unit cells. As shown in FIG. 3, in each unit of the fuel cells 20, an anode receives a supply of hydrogen gas (fuel gas), which is fed from hydrogen tanks 21, goes through a mass flow controller 22 for pressure and flow rate control, and is humidified by a humidifier 23, while a cathode receives a supply of pressure-regulated, compressed air (oxidizing gas) from an air compressor 13. The fuel cells 20 produce an electromotive force through electrochemical reaction of the hydrogen gas with the compressed air. Hydrogen is separated into proton and electron at the anode. The proton separated at the anode is transmitted through a polymer electrolyte membrane and reaches the cathode, while the electron separated at the anode runs through a connected electric circuit via a load and also reaches the cathode. Oxygen included in the compressed air reacts with the proton and the electron to produce water at the cathode. This electrochemical reaction generates an electromotive force.

The fuel cells 20 are integrally arranged in a lower space 15 of the front seat 14, as shown in FIG. 2. The lower space 15 is formed below the front seat 14 and is defined by a virtual vertical plane 15a including a knee joint position 16 of a driver or a passenger seated on the front seat 14 and by a virtual vertical plane 15b including a lower end of the seat back of the front seat 14. Part of the fuel cells 20 are located below a horizontal plane (hereafter referred to as the floor level FL) including a point that is in contact with the heel of the driver who is seated on the front seat 14 (driver's seat) and drives the vehicle, while a residual part of the fuel cells 20 are located above the floor level FL. In the structure of this embodiment, at least half of the fuel cells 20 are disposed above the floor level FL. As clearly shown in FIG. 2, the vehicle floor rises from the floor level FL to make the lower space 15 below the front seat 14 and receive the fuel cells 20 in this rising space. This structure enables arrangement of a smaller half of the fuel cells 20 below the floor level FL and a larger half above the floor level FL. In one possible modification, the vehicle floor may be dented from the floor level FL to make a lower space below the front seat 14 and receive the fuel cells 20 in the dented space. This modified structure enables arrangement of a larger half of the fuel cells 20 below the floor level FL and a smaller half above the floor level FL. In this modified structure, the fuel cells 20 are located above the vehicle floor, that is, in the passenger compartment 63. The knee joint position 16 may be set by seating a three-dimensional dummy (simulating an adult male) on the front seat 14.

Auxiliary machinery 30 of the fuel cells 20 include the air compressor 13, the hydrogen tanks 21, the mass flow controller 22, the humidifier 23, a DC/DC converter 24 actuated to lower the output voltage of the fuel cells 20 or the secondary battery 40 to a preset voltage level, a hydrogen gas circulation pump 25 driven to recirculate non-reacted hydrogen gas exhaust, which is discharged from the fuel cells 20, to the fuel cells 20, a water pump 26 used to circulate a flow of cooling water through the fuel cells 20 for cooling the fuel cells 20 down, the distributor 27 used to distribute the outputs of the fuel cells 20 and the secondary battery 40, and a radiator 32 used to remove heat from the cooling water (liquid coolant) circulated through the fuel cells 20 by the water pump 26. The distributor 27 is a switching circuit to give a power supply from either one or both of the fuel cells 20 and the secondary battery 40 to the auxiliary machinery 30 and the drive motor 11 and to charge the secondary battery 40 with electric power of the fuel cells 20.

The electric power output from the fuel cells 20 and/or the secondary battery 40 is transmitted via the distributor 27 to the DC/DC converter 24 for voltage drop to a preset level and is supplied to the auxiliary machinery 30. Among the auxiliary machinery 30, the air compressor 13 and the radiator 32 are placed in the front vehicle chamber 61 in the vicinity of the front wheels FW, while the multiple hydrogen tanks 21 are placed in a rear vehicle chamber 62 in the vicinity of rear wheels RW. The mass flow controller 22, the humidifier 23, the DC/DC converter 24, the hydrogen gas circulation pump 25, the water pump 26, and the distributor 27 are aligned on the left of the fuel cells 20 (on the left side in the traveling direction of the vehicle) in the lower space 15 of the front seat 14.

The secondary battery 40 includes plurality of known nickel metal hydride cells connected in series. The secondary battery 40 under control of the PCU 50 drives the drive motor 11 at a start of the vehicle, recovers a regenerative electric power in decelerating regenerative control, assists the drive motor 11 in acceleration, and is charged according to the loading state by the fuel cells 20. The secondary battery 40 is not restricted to the nickel metal hydride battery but may be any chargeable and dischargeable battery, for example, a nickel cadmium battery, a lithium metal hydride battery, or a lead-acid battery, or a capacitor.

The secondary battery 40 is integrally arranged in a lower space 18 of the rear seat 17, as shown in FIG. 2. The lower space 18 is formed below the rear seat 17 and is located behind a virtual vertical plane 18a including a knee joint position 19 of a passenger seated on the rear seat 17. Part of the secondary battery 40 is located below the floor level FL, while a residual part of the secondary battery 40 is located above the floor level FL. In the structure of this embodiment, at least half of the secondary battery 40 is disposed above the floor level FL. As clearly shown in FIG. 2, the vehicle floor rises from the floor level FL to make the lower space 18 below the rear seat 17 and receive the secondary battery 40 in this rising space. This structure enables arrangement of a smaller half of the secondary battery 40 below the floor level FL and a larger half above the floor level FL. In one possible modification, the vehicle floor may be dented from the floor level FL to make a lower space below the rear seat 17 and receive the secondary battery 40 in the dented space. This modified structure enables arrangement of a larger half of the secondary battery 40 below the floor level FL and a smaller half above the floor level FL. In this modified structure, the secondary battery 40 is located above the vehicle floor, that is, in the passenger compartment 63. The knee joint position 19 may be set by seating a three-dimensional dummy (simulating an adult male) on the rear seat 17. In the structure of the fuel cell vehicle 10 of this embodiment, the rear potion of the lower space 18 of the rear seat 17 overlaps the rear vehicle chamber 62. In one modified arrangement, the lower space 18 of the rear seat 17 is formed below the rear seat 17 and is defined by the virtual vertical plane 18a and a virtual vertical plane including a lower end of the seat back of the rear seat 17, and an area behind this lower space 18 is specified as the rear vehicle chamber 62.

The PCU 50 functions to control the driving force of the drive motor 11 and is constructed as a microcomputer-based logic circuit of a known structure (not shown) including a CPU, a ROM, a RAM, and input/output ports. The PCU 50 receives inputs of an accelerator opening from an accelerator pedal position sensor (not shown), output current and voltage levels of the inverter 12, an SOC (state of charge) of the secondary battery 40, and measurements of diverse sensors (not shown), and outputs control signals based on these inputs to the mass flow controller 22 and the air compressor 13 for regulation of the gas supply flows and to the inverter 12 and the distributor 27.

The working temperature of the fuel cells 20 is about 80° C., while the working temperature of the secondary battery 40 is not higher than 60° C. The fuel cells 20 are liquid-cooled (for example, water-cooled), whereas the secondary battery 40 is not liquid-cooled but is air-cooled. The fuel cells 20 and the secondary battery 40 are used in different working environments including the working temperature and the cooling system.

In the fuel cell vehicle 10 of this embodiment constructed as discussed above, the fuel cells 20 are not arranged in parts in the lower spaces 15 and 18 of the front and rear seats 14 and 17, and the secondary battery 40 is not arranged in part in the lower spaces 15 and 18 of the front and rear seats 14 and 17. The fuel cells 20 are integrally arranged in the lower space 15 of the front seat 14, whereas the secondary battery 40 is integrally arranged in the lower space 18 of the rear seat 17. The integral arrangements of the fuel cells 20 and the secondary battery 40 separately in the lower space 15 of the front seat 14 and in the lower space 18 of the rear seat 17 ensure high-performance operations of both the fuel cells 20 and the secondary battery 40 having different working environments. This arrangement also attains the effective use of the generally-dead, lower spaces 15 and 18 of the front and rear seats 14 and 17 to receive the fuel cells 20, the secondary battery 40, and their peripheral equipment.

The fuel cells 20 located in the lower space 15 of the front seat 14 do not sacrifice the riding comfortableness of the driver and the passenger seated on the front seat 14. Similarly neither the fuel cells 20 located in the lower space 15 of the front seat 14 nor the secondary battery 40 located in the lower space 18 of the rear seat 17 sacrifices the riding comfortableness of the passengers seated on the rear seat 17. Neither the lower space 15 of the front seat 14 nor the lower space 18 of the rear seat 17 interferes with the foot space of any of the driver and the passengers and thus worsens the riding comfortableness of the driver and the passengers.

The drive motor 11 and the PCU 50 are placed in the front vehicle chamber 61, while the hydrogen tanks 21 to give the supply of hydrogen gas to the fuel cells 20 are placed in the rear vehicle chamber 52. This arrangement attains the optimum weight balance along the longitudinal axis of the vehicle. The fuel cell vehicle 10 of this embodiment is front-wheel drive, so that the optimum arrangement gives a slightly heavier weight to the front portion of the vehicle than to the rear portion to ensure the efficient recovery of regenerative electric power.

Part of the auxiliary machinery 30 of the fuel cells 20 (that is, the mass flow controller 22, the humidifier 23, the DC/DC converter 24, the hydrogen gas circulation pump 25, the water pump 26, and the distributor 27) are arranged with the fuel cells 20 in the lower space 15 of the front seat 14. This arrangement desirably simplifies the gas piping layout, compared with separate arrangement of these auxiliary machines from the fuel cells. These auxiliary machines 30 are effectively arranged on the side of the fuel cells 20 in the lower space 15 of the front seat 14 along the width of the vehicle, which corresponds to the longitudinal axis of the lower space 15 of the front seat 14.

In the fuel cell vehicle 10 of this embodiment, the radiator 32, the fuel cells 20, and the secondary battery 40 are arranged in this order along the longitudinal axis of the vehicle from the front to the rear of the vehicle. This arrangement desirably shortens the distance between the fuel cells 20 and the radiator 32 and thus attains the compact layout, compared with the arrangement of the radiator 32, the secondary battery 40, and the fuel cells 20 in this order.

In the fuel cell vehicle 10 of this embodiment, the drive motor 11, the fuel cells 20, and the secondary battery 40 are arranged in this order along the longitudinal axis of the vehicle from the front to the rear of the vehicle. This arrangement desirably shortens the length of a relatively large-diameter wire connecting the drive motor 11 to the fuel cells 20 and thus attains the compact layout, compared with the arrangement of the drive motor 11, the secondary battery 40, and the fuel cells 20 in this order.

The larger half of the fuel cells 20 and the larger half of the secondary battery 40 are placed above the floor level FL. This layout readily assures the required minimum ground level of the vehicle, compared with the layout of the fuel cells 20 and the secondary battery 40 wholly located below the floor level FL.

In the event of a side collision, the center pillars 60, 60 formed upright on the left and right side faces of the fuel cell vehicle 10 to be located between the lower space 15 of the front seat 14 and the lower space 18 of the rear seat 17 receive a large part of the impact. The presence of the center pillars 60, 60 thus desirably protects the fuel cells 20 and the secondary battery 40 from the crash impact.

The embodiment discussed above is to be considered in all aspects as illustrative and not restrictive. There may be many other modifications, changes, and alterations without departing from the scope or spirit of the main characteristics of the present invention.

For example, the fuel cell vehicle 10 of the embodiment has the two rows of seats in the passenger compartment 63 aligned in the longitudinal axis of the vehicle. Three or a greater number of rows of seats may be provided in the passenger compartment of the vehicle. For example, in a vehicle with three rows of seats, when a seat in the front row is defined as the front seat, a seat in either the middle row or the rear row is set to the rear seat. When the seat in the middle row is defined as the front seat, on the other hand, the seat in the rear row is set to the rear seat. In the case where the rear seat is the seat in the rear row, it is not required to specify a rear boundary of a lower space of the rear seat. In the case where the rear seat is other than the seat in the rear row (for example, the seat in the middle row), however, it is desirable to specify the rear boundary of the lower space of the rear seat by a virtual vertical plane including a lower end of the seat back of the rear seat for the better riding comfortableness of the passengers seated on the seat in the rear row.

In the fuel cell vehicle 10 of the embodiment, the hydrogen tanks 21 are used as the source of the hydrogen gas (fuel gas) supplied to the fuel cells 20. The hydrogen tanks 21 may be replaced by a hydrogen storage alloy or by a reformer that produces hydrogen-rich gas through reaction of a hydrocarbon fuel (for example, gasoline or methanol) with water.

The fuel-cell vehicle 10 of the embodiment is front-wheel drive and accordingly does not have a hollow center tunnel rising from the floor level FL. In a vehicle with a hollow center tunnel structure, at least part of the auxiliary machinery 30 of the fuel cells 20 may be placed in the center tunnel. This layout ensures the effective use of the existing center tunnel to receive the auxiliary machinery therein without sacrificing the riding comfortableness of the driver and the passengers.

In the fuel cell vehicle 10 of the embodiment, the fuel cells 20 and their peripheral equipment are placed in the lower space 15 of the front seat 14, while the secondary battery 40 is placed in the lower space 18 of the rear seat 17. This layout may be reversed; that is, the fuel cells 20 and their peripheral equipment are placed in the lower space 18 of the rear seat 17, while the secondary battery 40 is placed in the lower space 15 of the front seat 14.

In the structure of the embodiment, part of the auxiliary machinery 30 (the air compressor 13 and the hydrogen tanks 21) are separately placed in the front vehicle chamber 61 and in the rear vehicle chamber 62. These auxiliary machines 30 may be arranged in the lower space 15 of the front seat 14 or in the lower space 18 of the rear seat 17.

In the fuel cell vehicle 10 of the embodiment, both the fuel cells 20 and the secondary battery 40 are used as the available power source of the drive motor 11. In this structure, the control may give the power supply from both of the fuel cells 20 and the secondary battery 40 to the drive motor 11 or may give the power supply from either one of the fuel cells 20 and the secondary battery 40 to the drive motor 11. In one possible modification, only either one of the fuel cells 20 and the secondary battery 40 may be used as the available power source of the drive motor 11. For example, one of the fuel cells 20 and the secondary battery 40 is used as the power source of the drive motor 11, while the other is used as the power source of other equipment (for example, auxiliary machinery). Another modified structure has another power source for the drive motor 11 in addition to the fuel cells 20 and the battery 40, and uses both or either one of the fuel cells 20 and the battery 40 to assist the additional power source. The drive motor 11 is accordingly structured to use at least one of the fuel cells 20 and the secondary battery 40 as the available power source.

The invention claimed is:

1. A fuel cell vehicle that is equipped with a drive motor and fuel cells, wherein at least part of auxiliary machinery of the fuel cells is arranged in a hollow center tunnel raised from a level floor surface in the fuel cell vehicle, and the at least part of auxiliary machinery is any one of at DC-DC converter for lowering output voltage of the fuel cells, a fuel gas circulation pump for circulating non-reacted fuel gas exhaust discharged from the fuel cells, and a water pump for circulating a flow of cooling water through the fuel cells for cooling the fuel cells down.

2. A fuel cell vehicle in accordance with claim 1, further comprising an accumulator,
wherein, a cooling system of the fuel cells, the fuel cells, and the accumulator are arranged in this order along a longitudinal axis of the vehicle from front to rear of the vehicle.

3. A fuel cell vehicle in accordance with claim 1,
further comprising an accumulator,
wherein the drive motor, the fuel cells, and the accumulator are arranged in this order along a longitudinal axis of the vehicle from front to rear of the vehicle, and
the fuel cells and the accumulator are protected by pillars formed upright on the left and right side faces of the fuel cells.

4. A fuel cell vehicle in accordance with claim 1,
wherein the at least part of auxiliary machinery is a distributor for distributing output of the fuel cells.

5. A fuel cell vehicle in accordance with claim 1,
wherein the at least part of auxiliary machinery is a gas pipe.

6. A fuel cell vehicle that is equipped with a drive motor, fuel cells, and an accumulator, comprising:
a vehicle floor that is rising or indented at two separate positions to form two rising or indented spaces, which are apart from each other across a preset interval,
wherein the fuel cells are integrally placed in one of the two rising or indented spaces, and the accumulator is integrally placed in the other of the two rising or indented spaces, and
wherein the accumulator is either of a secondary battery and a capacitor.

7. A fuel cell vehicle in accordance with claim 6, wherein peripheral equipment of the fuel cells and the accumulator are arranged in any one of the two rising or indented spaces, a front vehicle chamber in the vicinity of front wheels, and a rear vehicle chamber in the vicinity of rear wheels.

8. A fuel cell vehicle in accordance with claim 6, wherein neither of the two rising or indented spaces interferes with a foot space of any of the driver and the passenger.

9. A fuel cell vehicle in accordance with claim 6, wherein at least part of auxiliary machinery of the fuel cells is arranged together with the fuel cells in either of the two rising or indented spaces.

10. A fuel cell vehicle in accordance with claim 6, wherein the at least part of the auxiliary machinery of the fuel cells is aligned with the fuel cells in a direction of width of the vehicle in either of the two rising or indented spaces.

11. A fuel cell vehicle in accordance with claim 6, wherein at least part of auxiliary machinery of the fuel cells is arranged in a center tunnel.

12. A fuel cell vehicle in accordance with claim 6, wherein center pillars are formed upright between one of the two rising or indented spaces and the other of the two rising or indented spaces.

13. A fuel cell vehicle equipped with a drive motor, fuel cells, and an accumulator in accordance with claim 6, wherein the drive motor, the fuel cells, and the accumulator are arranged in this order along a longitudinal axis of the vehicle from front to rear of the vehicle.

14. A fuel cell vehicle in accordance with claim 13, wherein the drive motor is located in a front vehicle chamber in the vicinity of front wheels, and
a fuel gas source for feeding a supply of fuel gas to the fuel cells is located in a rear vehicle chamber in the vicinity of rear wheels.

15. A fuel cell vehicle in accordance with claim 14, said fuel cell vehicle further comprising a control module that controls supplies of electric power from the fuel cells and the accumulator and thereby regulates an output of the drive motor,
wherein the control module is arranged together with the drive motor in the front vehicle chamber in the vicinity of the front wheels.

16. A fuel cell vehicle equipped with a drive motor, fuel cells, and an accumulator in accordance with claim 6, wherein a cooling system of the fuel cells, the fuel cells, and the accumulator are arranged in this order along a longitudinal axis of the vehicle from front to rear of the vehicle.

17. A fuel cell vehicle in accordance with claim 16, wherein the drive motor is located in a front vehicle chamber in the vicinity of front wheels, and
a fuel gas source for feeding a supply of fuel gas to the fuel cells is located in a rear vehicle chamber in the vicinity of rear wheels.

18. A fuel cell vehicle in accordance with claim 17, said fuel cell vehicle further comprising a control module that controls supplies of electric power from the fuel cells and the accumulator and thereby regulates an output of the drive motor,
  wherein the control module is arranged together with the drive motor in the front vehicle chamber in the vicinity of the front wheels.

19. A fuel cell vehicle in accordance with claim 6, wherein at least either one of the fuel cells and the accumulator is located in a passenger compartment of the vehicle.

20. A fuel cell vehicle in accordance with claim 6, wherein the drive motor is located in a front vehicle chamber in the vicinity of front wheels, and
  a fuel gas source for feeding a supply of fuel gas to the fuel cells is located in a rear vehicle chamber in the vicinity of rear wheels.

21. A fuel cell vehicle in accordance with claim 20, said fuel cell vehicle further comprising a control module that controls supplies of electric power from the fuel cells and the accumulator and thereby regulates an output of the drive motor,
  wherein the control module is arranged together with the drive motor in the front vehicle chamber in the vicinity of the front wheels.

22. A fuel cell vehicle in accordance with claim 20, wherein the fuel gas source is a hydrogen tank.

23. A fuel cell vehicle in accordance with claim 6, wherein at least part of the fuel cells is located above a floor level of the vehicle.

24. A fuel cell vehicle in accordance with claim 6, wherein at least part of the accumulator is located above a floor level of the vehicle.

* * * * *

UNITED STATES PATENT AND TRADEMARK OFFICE
CERTIFICATE OF CORRECTION

PATENT NO.        : 7,703,564 B2                                    Page 1 of 1
APPLICATION NO.   : 11/588377
DATED             : April 27, 2010
INVENTOR(S)       : Toshiyuki Kondo It is certified that error appears in the above-identified patent and that said Letters Patent is hereby corrected as shown below:

| Column | Line | |
|--------|------|---|
| 9 | 44 | Before "DC-DC" change "at" to --a--. |
| 9 | 46 | Change "circulating" to --recirculating--. |

Signed and Sealed this

Fifth Day of October, 2010

David J. Kappos
*Director of the United States Patent and Trademark Office*